US008909994B2

(12) United States Patent
Carlough et al.

(10) Patent No.: US 8,909,994 B2
(45) Date of Patent: *Dec. 9, 2014

(54) DYNAMIC HARDWARE TRACE SUPPORTING MULTIPHASE OPERATIONS

(71) Applicant: International Business Machines Corporation, Armonk, NY (US)

(72) Inventors: Steven R. Carlough, Poughkeepsie, NY (US); Juergen Haess, Schoenaich (DE); Michael K. Kroener, Ehningen (DE); Silvia M. Mueller, Altdorf (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/095,635

(22) Filed: Dec. 3, 2013

(65) Prior Publication Data

US 2014/0095941 A1   Apr. 3, 2014

Related U.S. Application Data

(63) Continuation of application No. 13/525,054, filed on Jun. 15, 2012.

(51) Int. Cl.
*G06F 11/00* (2006.01)
*G06F 11/34* (2006.01)

(52) U.S. Cl.
CPC ............ *G06F 11/3476* (2013.01); *G06F 11/34* (2013.01)
USPC .............................................. 714/45; 714/39

(58) Field of Classification Search
USPC .................................................... 714/39, 45
See application file for complete search history.

(56) References Cited

U.S. PATENT DOCUMENTS

| 6,523,136 B1* | 2/2003 | Higashida ........................ 714/30 |
| 6,738,929 B2* | 5/2004 | Swoboda et al. ................ 714/28 |
| 7,003,763 B2* | 2/2006 | Sudo et al. ..................... 717/128 |
| 7,149,933 B2* | 12/2006 | Swaine et al. ................... 714/45 |
| 7,500,162 B2* | 3/2009 | Smith .............................. 714/725 |
| 7,996,821 B2* | 8/2011 | Sudo et al. ..................... 717/128 |
| 8,635,040 B2* | 1/2014 | Nose et al. ....................... 702/66 |
| 2002/0007264 A1* | 1/2002 | Swoboda ......................... 703/28 |
| 2008/0307203 A1* | 12/2008 | Bell et al. ....................... 712/210 |
| 2009/0055153 A1* | 2/2009 | Bell et al. ......................... 703/21 |
| 2009/0187747 A1* | 7/2009 | Mayer et al. ................... 712/227 |
| 2010/0268990 A1* | 10/2010 | Xu et al. ........................... 714/27 |
| 2013/0042155 A1* | 2/2013 | Millet et al. .................... 714/45 |

OTHER PUBLICATIONS

Microsoft Corporation, Microsoft Computer Dictionary, 2002, Microsoft Press, Fifth Edition, pp. 218 and 232.*

* cited by examiner

*Primary Examiner* — Scott Baderman
*Assistant Examiner* — Paul Contino
(74) *Attorney, Agent, or Firm* — Russell Ng PLLC; Matthew W. Baca

(57) ABSTRACT

A method and system for tracing in a data processing system. The method includes receiving a plurality of signals associated with an operation during execution of the operation. The method also includes, in response to an indication that the operation is a multiphase operation, during execution of the operation, selection logic, during a first phase of the multiphase operation, selecting and outputting as a trace signal a first signal of the plurality of signals, and during a second phase of the multiphase operation, selecting and outputting as the trace signal a second signal of the plurality of signals.

13 Claims, 4 Drawing Sheets

DYNAMIC HARDWARE TRACE SUPPORTING MULTIPHASE OPERATIONS

PRIORITY CLAIM

This application is a continuation of U.S. patent application Ser. No. 13/525,054, entitled "DYNAMIC HARDWARE TRACE SUPPORTING MULTIPHASE OPERATIONS," filed on Jun. 15, 2012, the disclosure of which is incorporated herein by reference in its entirety for all purposes.

BACKGROUND

1. Technical Field

The present invention generally relates to data processing, and more particularly, to dynamically modifying a hardware trace during multiphase operations.

2. Description of the Related Art

Modern processing systems are complex and difficult to design. One of the more challenging aspects of system design lies in analysis of the performance of the systems, including debugging the system and identifying problems, especially in early hardware versions. One important performance analysis tool is a hardware collected trace. Hardware logic traces may be limited because they cannot trace all signals of interest, especially for complex and data-dependent instructions.

BRIEF SUMMARY

Aspects of the described embodiments provide a method, a system, and a computer program product for tracing in a data processing system. The method includes receiving a plurality of signals associated with an operation during execution of the operation. The method also includes, in response to an indication that the operation is a multiphase operation, during execution of the operation, selection logic, during a first phase of the multiphase operation, selecting and outputting as a trace signal a first signal of the plurality of signals, and during a second phase of the multiphase operation, selecting and outputting as the trace signal a second signal of the plurality of signals.

With the system implementation, the system includes a processor, a memory, and a trace module that performs the various processes of the method, either in hardware or by executing code on the processor. Finally, the computer program product implementation comprises a computer readable storage medium that includes computer readable code which, when executed by a processor, the code is configured to perform the method processes.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments is to be read in conjunction with the accompanying drawings, wherein.

DETAILED DESCRIPTION

Figure 1:
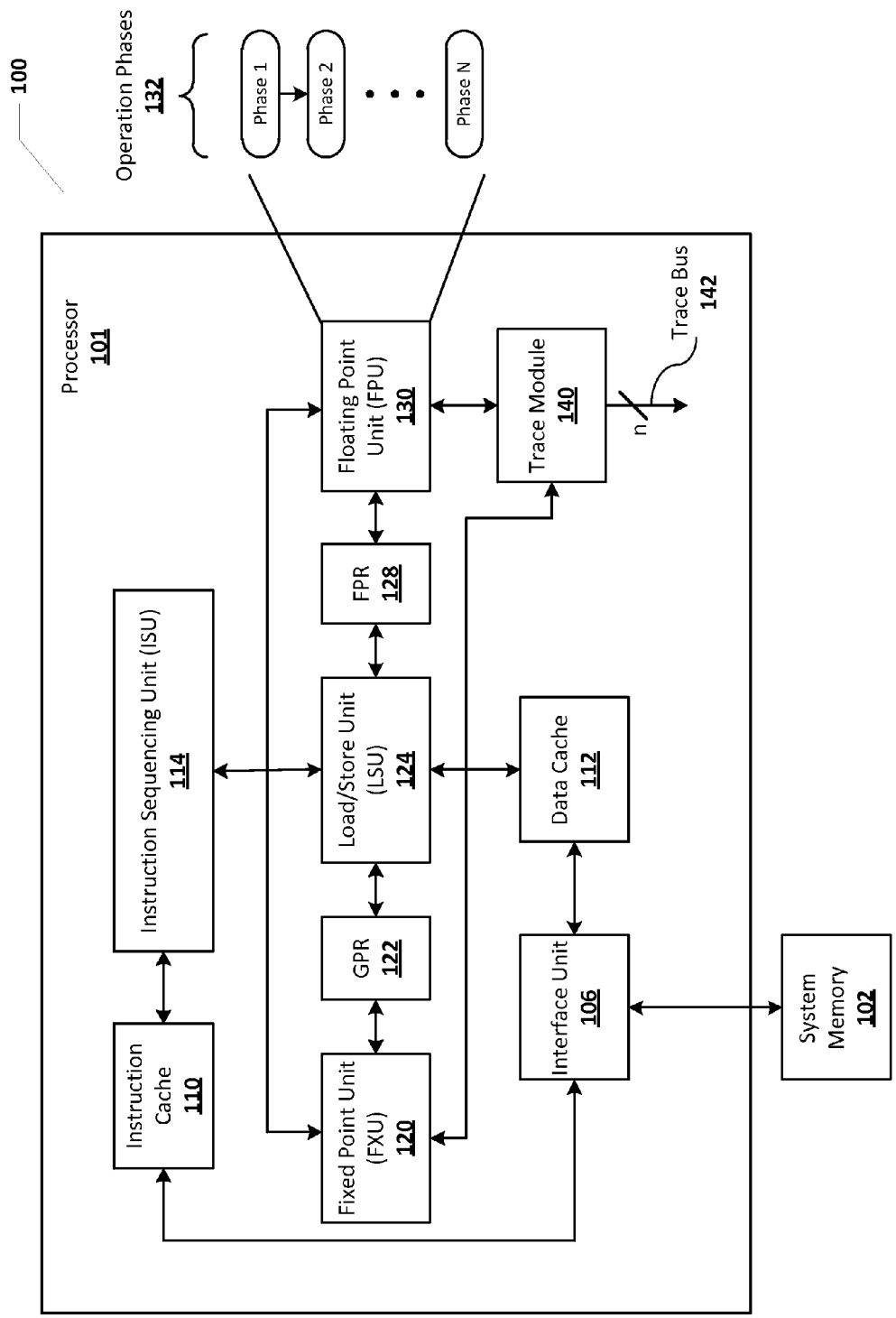
FIG. 1 provides a block diagram representation of an example data processing environment within which the invention can be practiced, according to one embodiment.

The illustrative embodiments provide a method, system and computer program product for tracing in a data processing system. In one or more embodiments, selection logic provides dynamic hardware tracing to meet special tracing requirements of multiphase operations, for example, extended precision multiplies, divides, or special convert instructions. Selection logic, including one or more multiplexers or switches, receives a set of signals associated with an operation during execution of the operation, and determines that the operation is a multiphase operation. In response, during execution of the operation, during a first phase of the multiphase operation, the selection logic selects and outputs as a trace signal a first signal of the plurality of signals, and during a second phase of the multiphase operation, the selection logic selects and outputs as the trace signal a second signal of the plurality of signals.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined by the appended claims and equivalents thereof.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions (or code). These computer program instructions may be provided to a processor of a general purpose computer, special purpose computer, or other programmable data processing apparatus to produce a machine, such that the instructions, which execute via the processor of the computer or other programmable data processing apparatus, implement the methods/processes/functions/acts specified in the one or more blocks of the flowchart(s) and/or block diagram(s).

These computer program instructions may also be stored in a computer readable medium that can direct a computer, other programmable data processing apparatus, or other devices to function in a particular manner, such that the instructions stored in the computer readable medium produce an article of manufacture (or computer program product) including instructions which implement the method/process/function/ act specified in the one or more blocks of the flowchart(s) and/or block diagram(s). The computer program instructions may also be loaded onto a computer, other programmable data processing apparatus, or other devices to cause a series of operational steps to be performed on the computer, other programmable apparatus or other devices to produce a computer implemented process/method, such that the instructions which execute on the computer or other programmable apparatus implement the method/process/functions/acts specified in one or more blocks of the flowchart(s) and/or block diagram(s).

It is understood that the use of specific component, device and/or parameter names (such as those of the executing utility/logic described herein) are for example only and not meant to imply any limitations on the invention. The invention may thus be implemented with different nomenclature/ terminology utilized to describe the components, devices, or parameters herein, without limitation. Each term utilized herein is to be given its broadest interpretation given the context in which that terms is utilized.

With reference now to the figures, and beginning with FIG. 1, there is depicted a block diagram representation of an exemplary data processing system 100. Data processing system 100 includes a processor 101, preferably realized as a single integrated circuit having an on-chip cache subsystem including instruction and data caches 110 and 112, respectively, to provide low latency access to cache lines corresponding to memory locations in, for example, a system memory 102, which is coupled to interface unit 106.

Instructions are fetched from instruction cache 110 and ordered for processing by instruction sequencing unit (ISU) 114. ISU 114 dispatches instructions according to instruction type. That is, fixed-point, load-store and floating point instructions are dispatched to fixed-point unit (FXU) 120, a load-store unit (LSU) 124, and floating-point unit (FPU) 130, respectively.

Each of execution units 120, 124, and 130 is preferably implemented as an execution pipeline having a number of pipeline stages 132. During execution within one of execution units 120, 124, and 130, an instruction receives operands, if any, from one or more architected and/or rename registers within a register file (e.g., general purpose registers (GPRs) 122 or floating-point registers (FPRs) 128) coupled to the execution unit. After an execution unit finishes execution of an instruction, the execution notifies ISU 114, which schedules completion of instructions in program order.

In one or more embodiments of the invention, execution units 120, 124, and 130 may execute an instruction in a multiphase operation including a series of operation phases. Multiphase operations may include, for example, multiplication, division, square root computation, etc. Depending on implementation, one operation phase may comprise operations performed at multiple stages of the execution pipeline, and/or one pipeline stage may perform multiple phases of the multiphase operation.

Operations within processor 101, including execution of instructions by the execution units, may be traced by trace module 140. In one or more embodiments of the invention, trace module 140 may collect data from the various execution units 120, 124, and 130 during execution of a multiphase operation and output trace bus 142. According to one or more embodiments, trace module 140 identifies a current phase of an executing multiphase operation and dynamically select a trace signal within trace bus 142 based on the current phase of the operation, clock cycles, or special events during execution of the multiphase operation. Those skilled in the art will appreciate that multiple trace signals may be generated in parallel within processor 101.

Figure 2:
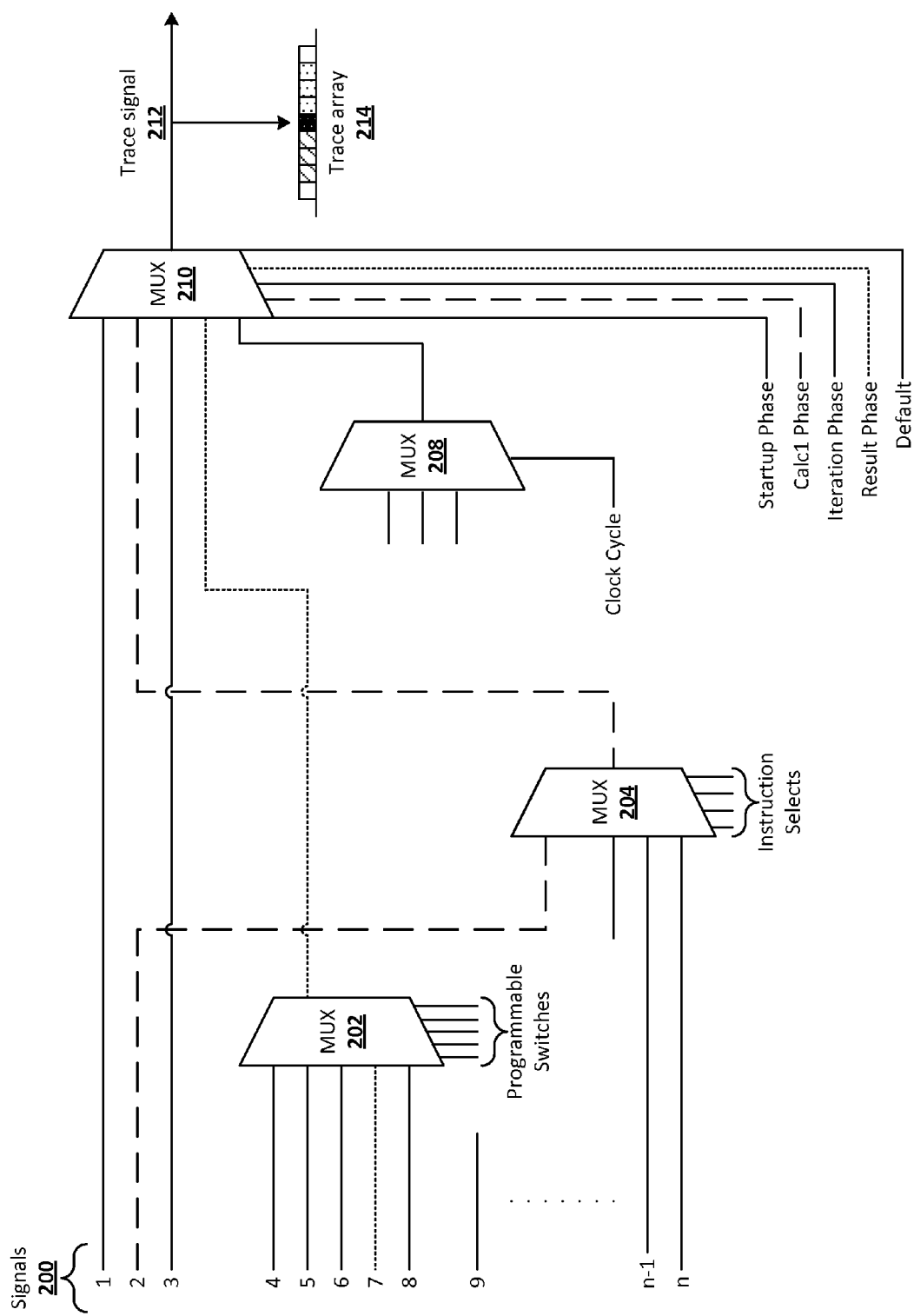
FIG. 2 provides a more detailed diagram of a portion of the trace module of FIG. 1 according to one embodiment.

FIG. 2 illustrates a more detailed view of an exemplary embodiment of a portion of trace module 140 of FIG. 1 that generates a particular trace signal within trace bus 142. As illustrated, trace module 140 includes selection logic, including, for example, multiplexers (MUXes) 202, 204, 208 and 210. Although FIG. 2 specifically illustrates the selection logic as a plurality of multiplexers, the selection logic can be implemented using any devices that can dynamically select a trace signal during execution of a multiphase operation. For example, in one or more embodiments, the selection logic may include one or more programmable switches.

Generally, FIG. 2 depicts trace module 140 receiving various signals 200 generated during execution of a multiphase operation, and producing a trace signal 212, which may be output or stored in a trace format 214, such as a trace array. In short, the selection logic (e.g., MUXes 202, 204, 208 and 210) receive a set of signals that are generated during a multiphase operation, and select a signal to include in trace signal 212 based on various parameters including, for example, a phase of execution, a clock cycle, detection of a specific event, etc. The selected signal is therefore included in the trace signal 212 unless and until a different signal is selected by the selection logic. Although a single trace signal 212 is depicted, trace module 140 may (and typically will) generate multiple trace signals in parallel.

In the specifically illustrated embodiment, signals 200 (e.g., signals 1-$n$) are generated by processor 101 and received by trace module 140 during a multiphase operation, such as the execution of a multiphase operation within one of execution units 120, 124, and 130. Some of signals 200, for example, signals 1 and 3, may be received directly by MUX 210. Others of signals 200 may be received by MUX 210 only after qualification by other selection logic (e.g., MUXes 202, 204,208). MUX 202 receives input signals 4-8 and selects one of them to become an input to MUX 210 from among signals 4-8 based on selection signals received from unillustrated programmable switches. MUX 204 similarly receives multiple input signals and selects one of its input signals as an input to MUX 210 based on the instruction under execution as indicated by one or more instruction selects. However, in one or more embodiments, MUX 204 selects among its input signals based at least in part on select signals that indicate occurrence of a special event, a clock cycle, etc. For example, in one or more embodiments, the identified special event may be external interrupts, instruction kills due to mispredicted instruction branches, a switch in a mode of operation, or any other indication that the regular flow of operation has changed. According to one or more embodiments, a special event is any event that is asynchronous to execution to the multiphase operation.

MUX 208, selects among its multiple inputs based on clock cycle. In other embodiments, the illustrated selection logic may differ, or may be located in a different location within FIG. 2. For example, MUX 208 may select from among its input signals based on a number of completed clock cycles during a specific phase of execution.

As described above, MUX 210 selects a signal for inclusion in trace signal 212 from among its inputs based on a plurality of select signals. For example, MUX 210 may receive via a default select input an indication that the currently executing operation is a single phase operation. In the case where the executing operation is a single phase operation, a default input signal of MUX 210 might be selected. If, on the other hand, the currently executing operation is a multiphase operation, MUX 210 dynamically selects from among its input signals based on the phase of the multiphase operation indicated by other of its select signals.

In the depicted example, MUX 210 receives signals 1, 2, 3, and 7, and during execution, dynamically selects different ones of these signals as the trace signal 212 based at least in part on phase information. For example, as depicted, during the Calc1 phase, signal 2 is selected as trace signal 212, whereas during the iteration phase, signal 3 is selected as trace signal 212, and during the result phase, signal 7 is selected as trace signal 212. Data from trace signal 212 is stored in the form of a trace array 214. As depicted, trace array 214 includes at least 9 bits, where three bits are depicted as originating from signal 2, one bit is depicted as originating from signal 3, and three bits are depicted as originating from signal 7.

Figure 3:
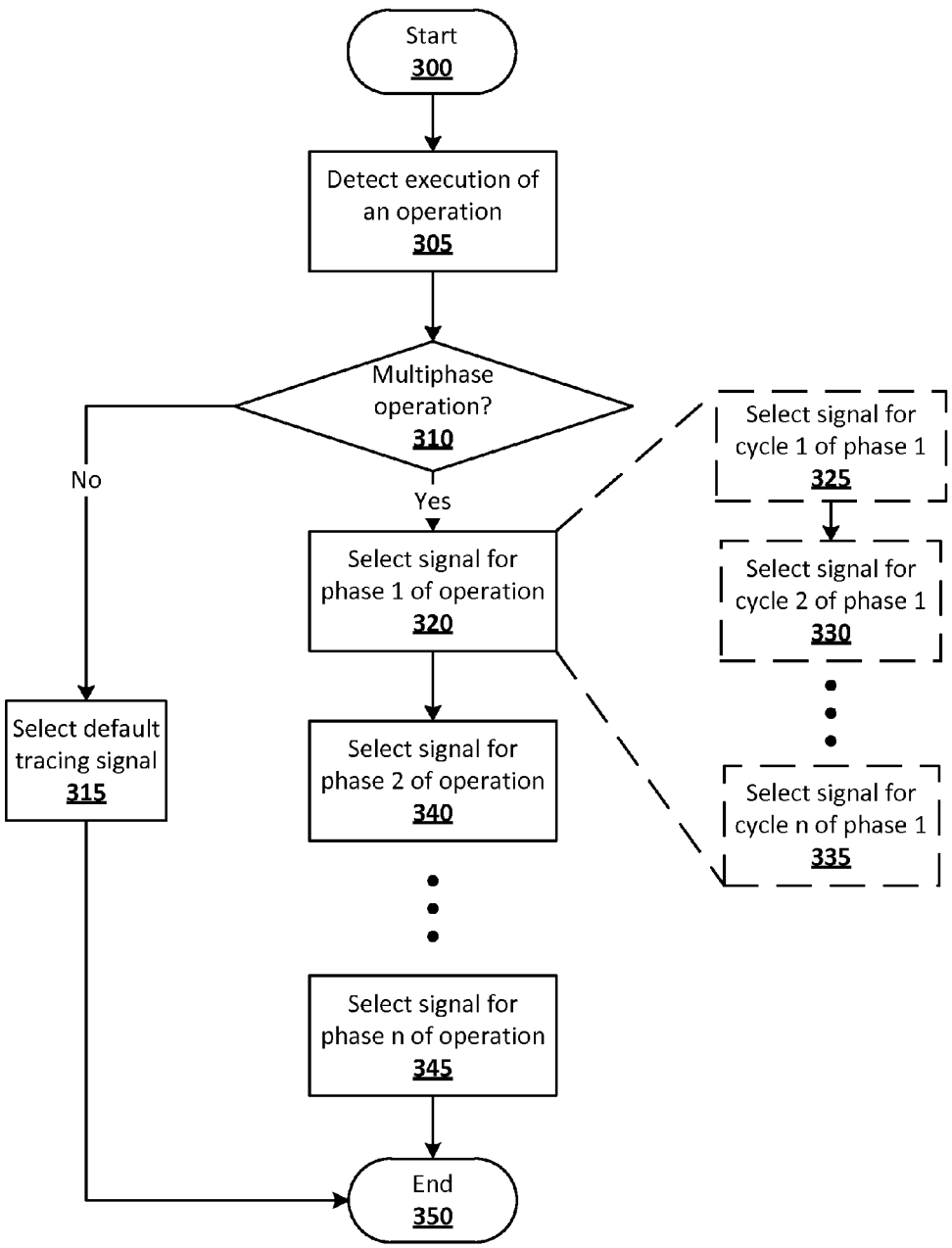
FIG. 3 is a flow chart illustrating a method for selecting a trace signal for a multiphase operation, according to one embodiment.

FIG. 3 is a flow chart illustrating an exemplary method for selecting a trace signal in accordance with one embodiment. Specifically, FIG. 3 illustrates a method, implemented by tracing module 140, to dynamically modify a trace signal during execution of an operation. Although FIGS. 1-2 illustrate the method may be performed in hardware, the method depicted in FIG. 3 may alternatively be implemented in the form of computer code executable by a computer processor. In the following discussion, reference will be made to the embodiments depicted in FIGS. 1-2 for clarity.

The method begins at block 300. At block 305, the tracing module 305 detects execution of an operation. The operation may be executed, for example, by one of the execution units 120, 124, or 130. At decision block 310, a determination is made regarding whether the operation is a multiphase operation. If the operation is not a multiphase operation, then the method continues at block 315 and a default trace signal is selected, and the method ends at block 350.

Returning to decision block 310, in response to a determination that the currently executing operation is a multiphase operation, then the method continues at block 320, and a trace signal is selected based on the current phase of the multiphase operation. For example, in the example shown in FIG. 2, MUX 210 selects signal 2 during the Calc1 phase.

In one or more embodiments, tracing module 140 may dynamically modify the trace signal within one or more of the operation phases of a multiphase operation based on clock cycle information. Steps 325-335 of the flowchart depict modifying the trace signal within an operation phase 1 based on clock cycle. At block 325, the trace signal is selected for the first clock cycle of the first phase, and at block 330, a trace signal is selected for the second clock cycle of the first phase. The trace module 140 may select a trace signal for any clock cycle of the first phase until the operational phase is complete at block 335.

After completion of the first phase of the operation, the method continues at block 340, and a trace signal is selected based on the second phase. For example, returning to FIG. 2, MUX 210 may select signal 3 during the Iteration phase. In one or more embodiments, several different trace signals may be selected during the second phase based on clock cycles. Signal selection continues in like manner through the final phase of the operation at block 345. The method ends at block 350.

In the flow chart above, one or more of the method steps may be embodied in a computer readable medium containing computer readable code such that a series of steps are performed when the computer readable code is executed on a computing device. In some implementations, certain steps of the method are combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

Figure 4:
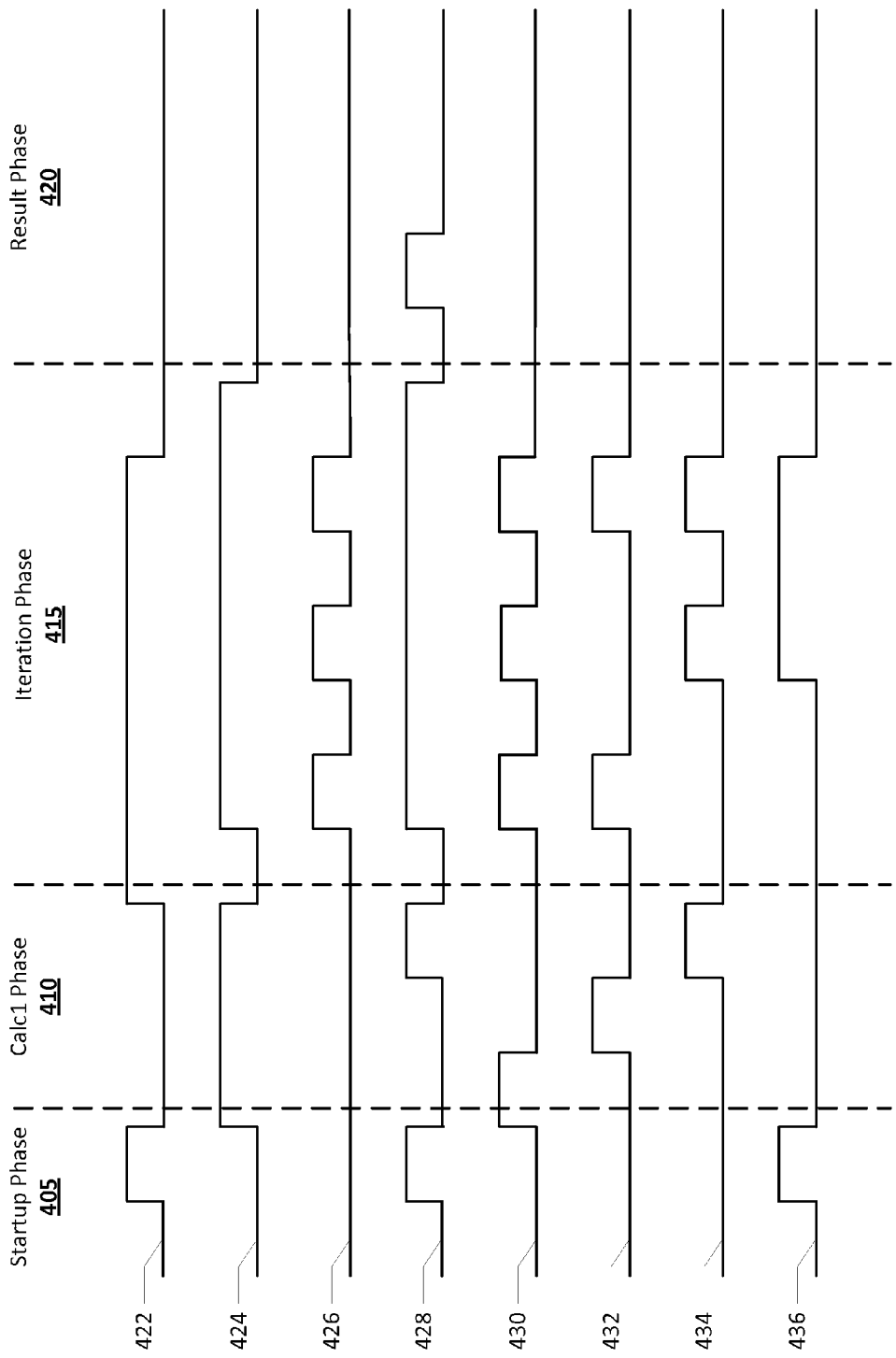
FIG. 4 is a timing diagram illustrating a plurality of trace signals comprising a trace bus, according to one embodiment.

FIG. 4 depicts an exemplary timing diagram of a plurality of trace signals comprising trace bus 142. Those skilled in the art will appreciate that the illustration depicted in FIG. 4 is merely one of a multiplicity of possibilities, and is not intended to limit the disclosure in any way.

As depicted, the example timing diagram includes several trace signals 422, 424, 426, 428, 430, 432, 434, and 436 generated by trace module 140 during execution of an operation, and output as trace bus 142. Some of the signals are static signals, and some of the signals are dynamic signals, meaning that the static signals are not impacted by the selection logic, while the dynamic trace signals are impacted by the selection logic. Said another way, the source of the dynamic trace signals may differ between various phases of execution of a multiphase operation, whereas the origin of the static signals remains the same.

Signals 422, 424, 426, and 436 are examples of static signals. Signals 422 and 424 are predetermined signals that indicate various phases of execution. Specifically, as depicted, the values of signals 422 and 424 indicate the beginning of Calc1 phase 410 and iteration phase 415. Signal 424 also indicates the beginning of the result phase 420. In one or more embodiments, other predetermined signals may indicate occurrence of special events or different cycles within a phase. Signal 426 is an example of a signal that indicates cycles of a clock signal within iteration phase 415. In some embodiments, a specific signal may be of permanent interest, or common for all instructions. For example, a signal that reports the actual state of the execution unit, such as interface signals or general counters.

Signals 428, 430, 432, and 434 have values that vary in response to the various phases of execution of the multiphase operation. Trace signals 428, 430, 432, and 434 may originate from various sources during the various operation phases, or even within the operation phases. For example, referring back to FIG. 2, the value of each of trace signals 428, 430, 432, and 434 may originate from various signals 200 in different phases of execution, or even within a select phase based on clock cycle or special event.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code (or instructions) embodied thereon.

Any combination of one or more computer readable medium(s) may be utilized. The computer readable medium may be a computer readable signal medium or, alternatively, a computer readable storage medium. In some embodiments, aspects of the present invention may be embodied within a data replication module (e.g., FPGA or firmware) and implemented in firmware or logic. You can also call these embodiments, a "data replication module" or the like. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible storage device that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, R.F, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a computer program product in a variety of forms, and that an illustrative embodiment of the present invention applies equally regardless of the particular type of media used to actually carry out the distribution.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A method for tracing execution of an instruction by a processor, the method comprising:
    dispatching, by an instruction sequencing unit of the processor, instructions for execution;
    executing, by one or more execution units of the processor, instructions dispatched by the instruction sequencing unit, wherein the executing includes the one or more execution units executing a first instruction in a multiphase operation including a sequential series of phases and executing a second instruction in a uniphase operation having a single phase;
    during instruction execution by the one or more execution units, receiving, by a trace module, a plurality of internal signals of the processor associated with the instruction execution, wherein the plurality of internal signals includes a phase signal that, for an instruction executed in a multiphase operation, indicates a current phase of the multiphase operation; and
    in response to an indication that execution of the first instruction is a multiphase operation, the trace module:
        during a first phase of execution of the first instruction, dynamically selecting and outputting as a trace signal a first signal of the plurality of internal signals based at least in part on the phase signal; and
        thereafter, during a second phase of execution of the first instruction, dynamically selecting and outputting as the trace signal a different second signal of the plurality of internal signals based at least in part on the phase signal.

2. The method of claim 1, wherein the trace signal is a first trace signal, the method further comprising:
    during execution of the multiphase operation, selecting and outputting a third signal as a second trace signal, wherein the first trace signal and the second trace signal are selected in parallel.

3. The method of claim 1, wherein the method further comprises the trace module receiving a clock cycle indication;
    wherein selecting and outputting the first signal comprises selecting and outputting the first signal in response to the clock cycle indication indicating a first clock cycle of the first phase; and
    wherein the method further comprises the selection logic selecting and outputting as the trace signal a third signal of the plurality of internal signals in response to the clock cycle indication indicating a second clock cycle of the first phase.

4. The method of claim 1, further comprising, in response to determining that the operation is a multiphase operation, during execution of the operation, the trace module:
    determining a type of the first phase, wherein the first signal is further selected based on the determined type of the first phase.

5. The method of claim 1, and further comprising the trace module detecting an event that is asynchronous to execution of the first instruction, wherein the trace module further selects the first signal based on the detected event.

6. The method of claim 1, wherein selecting the first signal comprises selecting the first signal utilizing a multiplexer.

7. The method of claim 1, wherein selecting the first signal comprises selecting the first signal utilizing a programmable switch.

8. The method of claim 1, wherein the first instruction comprises a mathematical instruction.

9. The method of claim 1, and further comprising storing time-ordered values of the trace signal corresponding to the first signal and the second signal in a storage array.

10. The method of claim 1, wherein the first instruction is an instruction from a set including a multiplication instruction, a division instruction, a square root instruction, and a convert instruction.

11. The method of claim 1, wherein the sequential series of phases includes a startup phase, a calculation phase, an iteration phase, and a result phase.

12. The method of claim 1, and further comprising:
in response to an indication that the second instruction is a uniphase instruction, the trace module selecting and outputting as the trace signal a default signal among the plurality of internal signals.

13. The method of claim 1, wherein:
the one or more execution units include an execution pipeline formed of multiple execution stages; and
each of the series of phases corresponds to a respective subset of the multiple execution stages.

\* \* \* \* \*